(12) United States Patent
Radtke

(10) Patent No.: US 7,288,740 B2
(45) Date of Patent: Oct. 30, 2007

(54) WELDING DEVICE HAVING MULTIPLE PROTECTIVE COVERS AND CONNECTION PATHS

(75) Inventor: David E. Radtke, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 549 days.

(21) Appl. No.: 10/249,909

(22) Filed: May 16, 2003

(65) Prior Publication Data

US 2004/0226930 A1  Nov. 18, 2004

(51) Int. Cl.
*B23K 9/10* (2006.01)
(52) U.S. Cl. .................. 219/130.1; 219/136; 312/223.1
(58) Field of Classification Search ............. 219/130.1, 219/137.63, 136; 312/223.1, 223.2, 257.1, 312/265.6; 220/4.02
See application file for complete search history.

(56) References Cited

U.S. PATENT DOCUMENTS 5,091,827 A * 2/1992 Suret et al. ................. 361/818
5,122,069 A * 6/1992 Brownlie et al. ........... 439/131
5,734,148 A * 3/1998 Latvis et al. ................ 219/133
6,101,773 A * 8/2000 Chau et al. ................ 52/220.7

OTHER PUBLICATIONS

Lincoln Electric, The Welding Experts, RangerTM 250, Apr. 2002, pp. 1-7.

* cited by examiner

*Primary Examiner*—Kevin P. Kerns
(74) *Attorney, Agent, or Firm*—Ziolkowski Patent Solutions Group, SC

(57) ABSTRACT

A housing of a welding-type device includes a bezel which encloses a plurality of electrical receptacles and a plurality of terminal posts of the welding-type device. The bezel has a first and a second opening corresponding to each terminal post. The plurality of first openings has hinged covers attached to the bezel over the openings. The plurality of second openings is uninterrupted through the bezel and constructed such that the bezel provides strain relief to a welding cable which passes therethrough. The covers are formed such that they allow passage of an electrical cable through the first opening with the cover in a closed position.

27 Claims, 4 Drawing Sheets

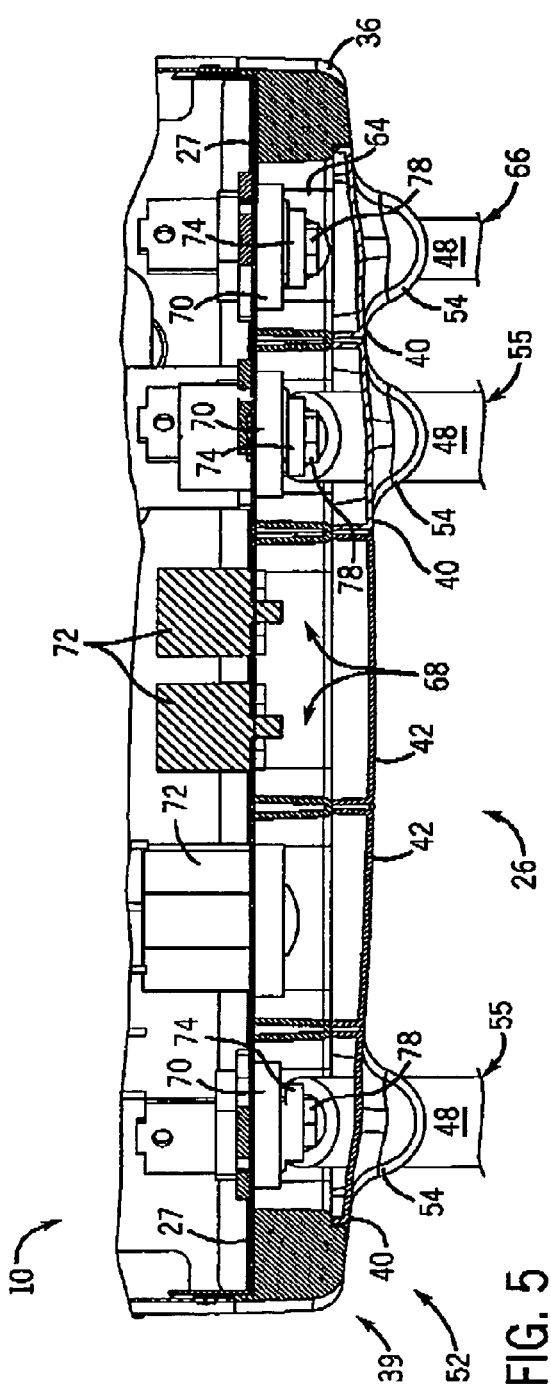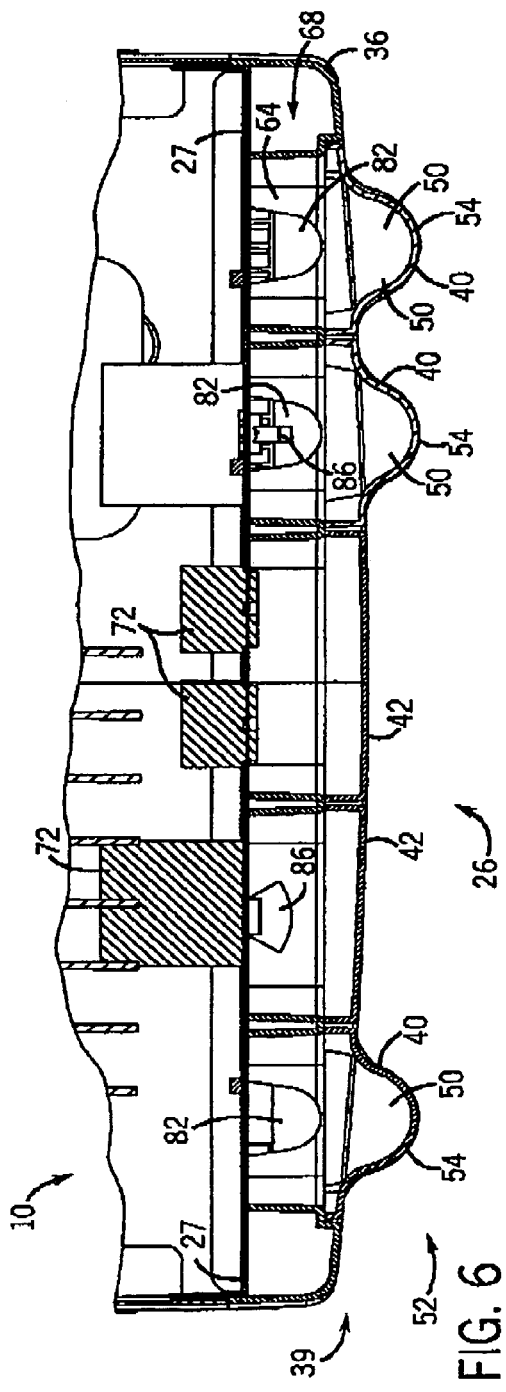

WELDING DEVICE HAVING MULTIPLE PROTECTIVE COVERS AND CONNECTION PATHS

BACKGROUND OF INVENTION

The present invention relates generally to welding-type devices and, more particularly, to a housing assembly having a plurality of accessory/outlet covers and a number of protected connection paths therethrough.

Welding-type devices generally have a housing which fully encloses the electrical components of the welding-type device. A plurality of electrical outputs is accessible to an operator through the housing of the welding-type device. Preferably, these outputs include terminal posts and receptacles. The terminal posts provide a power signal that is conditioned by the welding-type device to be used for the welding process. The receptacles are preferably electrical receptacles which supply a power signal which has been conditioned to operate other electrical devices. These other electrical devices can include items such as hand tools and spot lights. The housing preferably needs to provide the operator with easy access to both the terminal posts and the receptacles.

Welding-type devices are also increasingly portable due to improvements in the size and efficiency of internal combustion engines. This portability means that the welding-type device is exposed to increasingly polluted environments. This pollution ranges from dirt and debris to wind and rain. Also problematic to the longevity of a welding-type device is the significant amount of particulate pollution in the general area of the welding device when the device is in use. These pollutants include metal chips and dust generated in preparing work pieces with grinders, hot metal spatter from the welding process, and slag that is chipped from completed welds. All of these pollutants can adversely affect the operability of the welding-type device and the condition of the terminal posts and receptacles. Additionally, welding spatter can damage the terminal posts if welding is performed too close to the welding-type device. Therefore, the housing needs to protect the receptacles and the terminal posts both during operation and during transportation of the welding-type device.

Protection of electrical receptacles is not new to welding-type devices. Prior art protective devices generally consist of a cover that is closed when the electrical receptacle is not used and open when the receptacle is used. As such, these protective devices don't protect the receptacle from debris when the welding-type device is in use. As discussed above, when the welding-type device is in use, the receptacles of the device can be exposed to the highest concentrations of polluting debris as a result of welding related activities. Additionally, these welding-type devices offer no protection to the terminal posts of the welding-type device. The terminal posts generally protrude through the housing and are afforded no protection from welding spatter. As a result, the terminal posts are susceptible to damage from metal spatter associated with metal working processes such as torch cutting and heating, metal grinding, and welding.

The terminal posts of the welding-type device are preferably connected to heavy gauge welding cables. These heavy gauge welding cables transfer the conditioned electrical signal from the welding-type device to the consumable and to a work piece. The cables are preferably connected to the welding-type device by a connector at an end of the cable. These cables can be inadvertently over stressed by an operator during the welding process. As such, the cables require a durable mechanical connection at the terminal post of the welding-type device. The durable connection allows the stresses that are imparted on the cable to transfer through the housing and either into the connection itself or into the electrical components of the welder. These stresses can concentrate at the terminal post connections and can cause mechanical damage to the electrical system of the welding-type device, the terminal post, or the cable connector. As such, it would be desirable to construct the housing of the welding-type device to absorb the stresses that would be imparted on the terminal post connection through the welding cable.

Ease of repair and versatility are also important aspects of any portable welder. Due to the environment that these devices are employed in, remote repairs will be inevitable. In this respect, the housing of the welding-type device should be designed such that it allows for relatively simple replacement of a welding cable in the event the welding cable becomes damaged. Additionally, there may be multiple terminal posts provided to supply different output parameters for the welding process. In this respect, the housing needs to provide an operator with easy access to the terminal post connections so that the welding cables can be quickly changed between terminal connections.

It would therefore be desirable to design a housing for a welding-type device that protects, covers, and isolates the electrical receptacles and the terminal posts of a welding-type device during transportation and use of the device. The housing should also be designed to absorb stresses transferred through the welding cable to the welding-type device at the terminal post connections. The housing should also be designed to provide an operator with a quick and simple means of transferring the welding cables between terminal posts.

BRIEF DESCRIPTION OF INVENTION

The present invention is directed to an end panel for a welding power supply housing that solves the aforementioned problems. The end panel has a first and a second electrical paths through the housing for each of a plurality of terminal posts of the welding power supply. A plurality of covers is positioned over the electrical paths through the housing. The covers are pivotally attached to the end panel of the housing and cover a plurality of electrical receptacles and the plurality of terminal posts of the welding power supply. A number of covers are constructed to allow an electrical cable to pass through the first electrical path with the respective cover in a closed position. The second electrical path is constructed such that the housing absorbs stresses transferred along the electrical cable prior to the stresses reaching the terminal post.

Therefore, in accordance with one aspect of the present invention, a housing of a welding-type apparatus includes a bezel attached to an end panel. The bezel includes a plurality of covers which are pivotally attached to the bezel over a plurality of terminal post openings. Each cover has a passage therein to allow passage of a cable therethrough when the covers are in a closed position.

In accordance with another aspect of the present invention, a housing of a welding-type device includes an end panel and a bezel. A plurality of terminal posts is attached to the end panel of the welding-type device. The bezel is attached to the end panel thereby covering the plurality of terminal posts of the end panel. The bezel includes at least two passages formed therein in association with each of the plurality of terminal posts. Each of the passages per terminal post are constructed to allow passage of a welding cable therethrough.

In accordance with a further aspect of the present invention, a welding-type device includes an end panel, a bezel, and a plurality of covers attached to the bezel. The bezel is attached to the end panel with the respective covers positioned over respective electrical components of the end panel of the welding-type device. The covers are attached to the bezel by a common hinge pin such that the covers are independently pivotable about the hinge pin.

In accordance with still a further aspect of the present invention, a method of assembling a welding device is disclosed. The method includes forming a bezel having a plurality of covers commonly hinged thereto. The bezel is then attached to the welding device such that the covers pivotally conceal electrical components of the welding device.

In accordance with yet a further aspect of the present invention, a method of assembly a welding device includes forming a bezel having a lateral rib. A lower cable passage is formed in the lower rib to allow passage of a cable therethrough. The bezel is then attached to the welding device so that the cable can be connected to a terminal post of the welding device.

In accordance with another aspect of the present invention, a welding device includes a bezel. The bezel includes a control window, a cover array and an opening to allow the passage of air through the bezel via a dividing web. The cover array is attached to the control window between the control window and the opening. The cover array of the bezel has a uniform pivot axis such that the individual covers of the cover array are aligned with respect to the uniform axis.

Therefore, the present invention provides protection of the electrical receptacles and terminal posts of the welding-type apparatus while allowing the terminal posts to be physically accessible. The present invention allows a cable to pass through the housing of the welding-type device while also providing protection to the underlying electrical terminal or receptacle. Additionally, the present invention also allows a cable to be connected to the welding-type apparatus in such a way that the housing of the apparatus absorbs forces carried to the welding-type apparatus by the cable before these forces propagate to the electrical terminal the cable is connected to. The present invention also provides a honey-combed opening attached to the bezel of the welding-type apparatus. This construction allows for adequate cooling flow through the welding-type apparatus while also filtering that flow for those particles that are larger than the individual cells of the honey-combed shape.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 5 is a cross-sectional top view of the welding-type device taken along plane 5-5 shown in FIG. 2.

FIG. 6 is a cross-sectional top view of the welding-type device taken along plane 6-6 shown in FIG. 2.

DETAILED DESCRIPTION

As one skilled in the art will fully appreciate, the hereinafter description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, welding device, welder-type device, welder device, or welders generally, includes welding, cutting, or heating power. Description of a welding apparatus illustrates just one embodiment in which the present invention may be implemented. The present invention is equivalently applicable with any power system requiring multiple electrical outputs.

Figure 1:
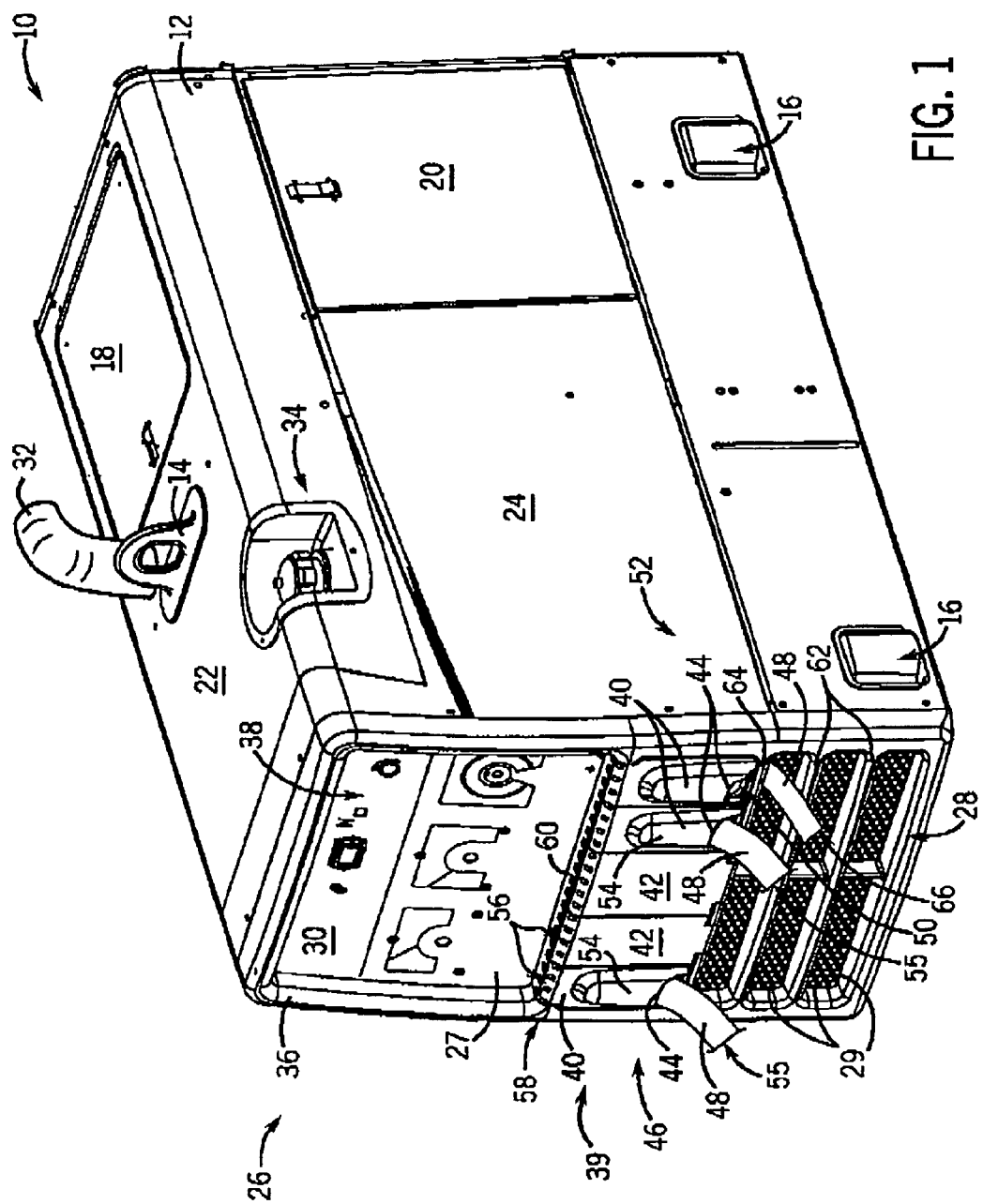
FIG. 1 is a perspective view of the welding-type apparatus according to the present invention.

FIG. 1 shows one such welding-type device 10. Welding device 10 includes a housing 12 which encloses the internal components of the welding device. The welding device 10 includes, a front panel assembly 26 including an end panel 27 and a bezel 36 as will be described in greater detail below. Optionally, welding device 10 includes a lifting eye 14 and/or mounting recesses 16. Lifting eye 14 facilitates the portability of welding device 10. Optionally, the welding device could include a handle and/or wheels as a means of device mobility. Mounting recesses 16 are used to facilitate securing welding device 10 either in a fixed position such as to a shop floor, or to a mobile vehicle such as a truck bed. Housing 12 also includes a plurality of access panels 18, 20. Access panel 18 provides access through a top panel 22 of housing 12 while access panel 20 provides access through a side panel 24 of housing 12. A similar access panel is available on an opposite side. End panel 27 includes a vent 28 having a honey-combed configuration. Vent 28 allows air to flow through housing 12 of welding device 10.

Housing 12 of welding-type device 10 can house an internal combustion engine. The engine is evidenced by an exhaust 32 and a fuel filler 34 that protrude through housing 12. Exhaust 32 extends above top panel 22 of housing 12 and directs exhaust emissions away from the welding-type device 10. Fuel filler 34 preferably does not extend beyond top panel 22 or side panel 24. Such a construction protects fuel filler 34 from damage during transportation and operation of welding-type device 10. Front panel 26 also has a controls section 30 that preferably includes the necessary controls required to operate the engine and condition the welding signal outputs. Although not shown, such controls generally include voltage and current controls as well as output gauges and/or indicator lights. This construction allows an operator to conveniently control the multiple functions and systems of welding device 10 from a common area. Although shown to include an engine, the present invention is equally applicable to welding-type devices that require an external power source.

Referring again to front panel 26, a bezel 36 is shown positioned over end panel 27. Bezel 36 of front panel 26 of housing 12 generally encloses end panel 27 of welding-type device 10. Bezel 36 has a control window 38 constructed such that when bezel 36 is attached to end panel 27, bezel 36 does not interfere with a user's access to controls section 30. Bezel 36 also includes a cover array 39. Cover array 39 includes a plurality of terminal post covers 40 and a plurality of accessory covers 42. Although bezel 36 is shown to include three terminal post covers 40 and two accessory covers 42, this is only by way of example and is in no way intended to limit the scope of the present claims and disclosure. It is understood that multiple different cover configurations are envisioned by the present invention.

Terminal post covers 40 include an arc-shaped recess 44 formed at a lower end 46 of each terminal post cover 40. Arc-shaped recess 44 defines a portion of a perimeter of an opening 50. Opening 50 is formed by arc-shaped recess 44 of terminal post cover 40 and bezel 36 when terminal post cover 40 is in a closed position 52. Cable 48 leads from end panel 27 through opening 50 of bezel 36 and terminal post cover 40 to an exterior of welding device 10. Terminal post covers 40 are considered open when terminal post cover 40 is in any position other than closed position 52. Terminal post covers 40 also include a protrusion 54. Protrusion 54 is defined as a raised center portion of terminal post covers 40. Protrusion 54 is constructed in terminal post cover 40 to accommodate cable 48 which passes therebehind. This orientation of cable 48 to bezel 36, passing through opening 50, defines a first cable orientation 55. A second cable orientation will be described in detail below and the distinction between the first and second cable orientation should become apparent.

Accessory covers 42 are shown located between a pair of terminal post covers 40. Accessory covers 42 cover receptacles of the end panel 27 of welding-type device 10 as will be discussed in respect to FIG. 2 below. Accessory covers 42 and terminal post covers 40 each include a hinge portion 56. Hinge portions 56 are formed in an upper portion 58 of covers 40, 42. Hinge portions 56 interact with a hinge portion 60 of bezel 36. Hinge portion 60 of bezel 36 traverses the majority of the width of bezel 36 and, with a single hinge pin, pivotally secures covers 40, 42 to bezel 36. Each cover 40, 42 are independently rotatable with respect to bezel 36. As such, one cover 40, 42 can be rotated without disturbing the position of any of the other covers 40, 42.

Located below cover array 39 of bezel 36 is vent 28 having a number of honey-combed openings 29. Bezel 36 includes a plurality of lateral ribs 62 which traverses honey-combed openings 29. An uppermost rib 64 of bezel 36 is directly below cover array 39. A second cable orientation 66 is defined by the passing of cable 48 through uppermost rib 64 of bezel 36.

Figure 2:
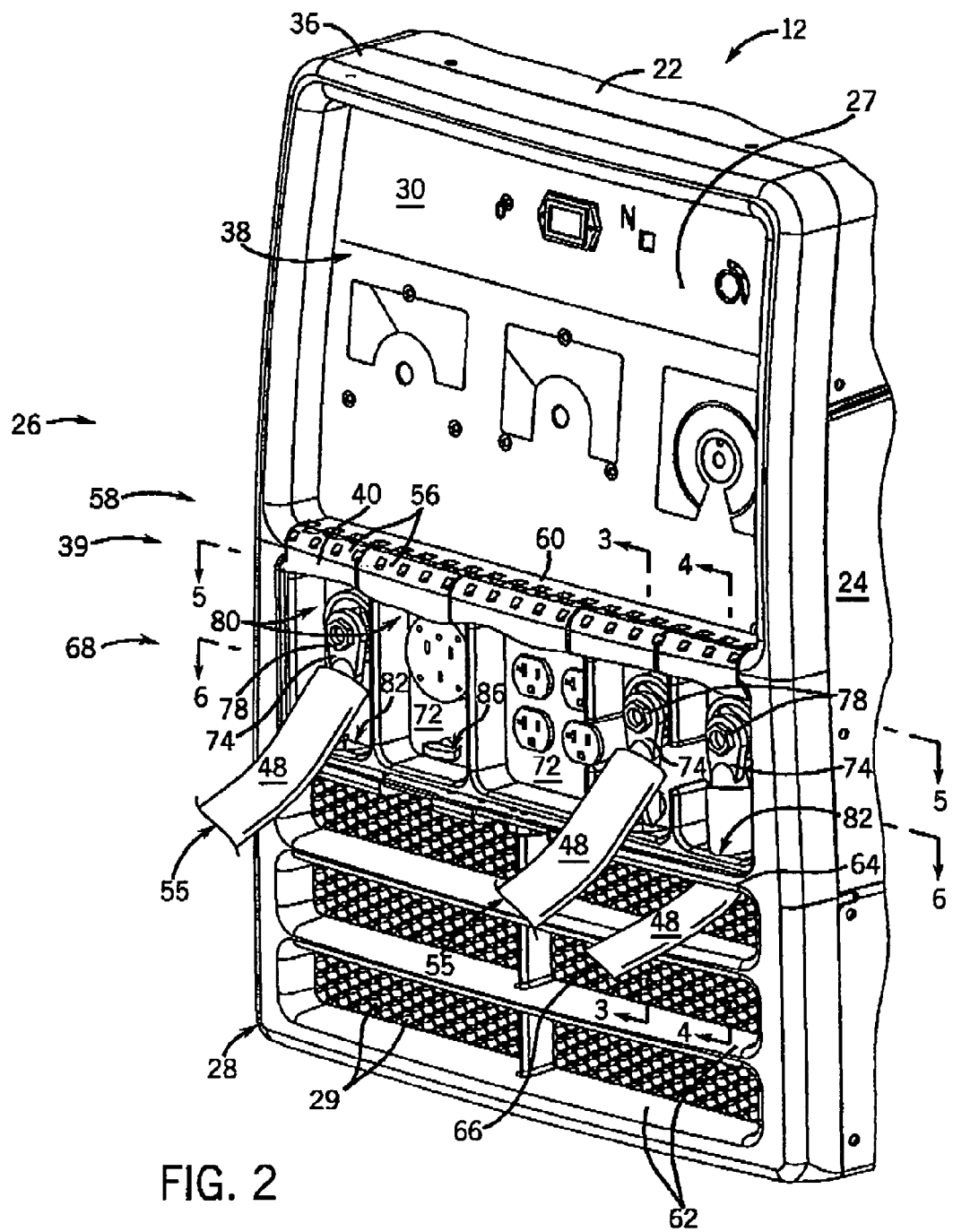
FIG. 2 is a perspective view of the end panel of the welding-type apparatus shown in FIG. 1.

FIG. 2 shows covers 40, 42 broken away. Hinge portions 56 of covers 40, 42 are shown attached to bezel hinge portion 60. Removal of a portion of all of the covers reveals an accessory array 68. Accessory array 68 includes a plurality of terminal posts 70 and a plurality of outlet receptacles 72. The name associated with the respective covers should now be apparent. Those covers that cover a receptacle are termed receptacle covers and those covers that cover a terminal post are termed terminal post covers. The outlets are shown only by way of example. It is understood that there are multiple well known outlet configurations. The outlet configurations shown are merely by way of example and in no way intended to limit the scope of the present claims or invention. Also shown in FIG. 2 is a circuit reset 86. Circuit reset 86 is shown adjacent outlet receptacle 72 as a breaker switch. It is understood that such a circuit reset could also be a reset button rather than a breaker switch. Regardless of the construction, circuit reset 86 protects those electrical devices that are connected thereto from power surges and inadvertent shorting.

First cable orientation 55 and second cable orientation 66 are shown most clearly with terminal post covers 40 partially removed. Each cable 48 includes a connector 74 to mechanically and electrically connect each cable 48 to terminal post 70 of the welding device 10. A nut 78 secures connector 74 to terminal post 70. Bezel 36 includes a plurality of first openings 80. The first opening 80 of bezel 36 exists for each respective component of electrical array 68. First openings 80 are formed by covers 40, 42 of bezel 36 to allow access to terminal posts 70 and receptacles 72 of electrical array 68 of end panel 27 of welding device 10. That is, covers 40, 42 are pivotally connected to bezel 36 such that covers 40, 42 cover respective first openings 80. Bezel 36 also includes a plurality of second openings 82. The second opening 82 exists for each terminal post 70 of end panel 27. Second openings 82 extend through uppermost rib 64 of bezel 36 and are constructed to allow for passage of cable 48 therethrough. Second openings 82 of bezel 36 are also not interrupted by a respective terminal post cover 40. One could also add a second opening for each of the outlet receptacles 72.

First cable orientation 55 is represented by the two left most cable orientations of FIG. 2. Cable 48 passes through first opening 80 of bezel 36. Connector 74 of cable 48, is bent slightly away from end panel 27, and is secured to terminal post 70 via nut 78. Second cable orientation 66 is shown in the right most cable orientation of FIG. 2. Cable 48 passes through second opening 82 in uppermost rib 64 of bezel 36. In second cable orientation 66, connector 74 of cable 48 is relatively straight and is also secured to terminal post 70 via nut 78. Second cable orientation 66, and specifically second opening 82 through uppermost rib 64 of bezel 36, provides that bezel 36 will be required to absorb a substantial portion of any stresses or strains transferred toward welding device 10 by cable 48. This construction lessens the amount of forces exerted on terminal post 70, connector 74, and nut 78 from a pulling action on cable 48. The passing of cables 48 through second opening 82 of bezel 36 provides the terminal post connection with a strain relief.

Figure 3:
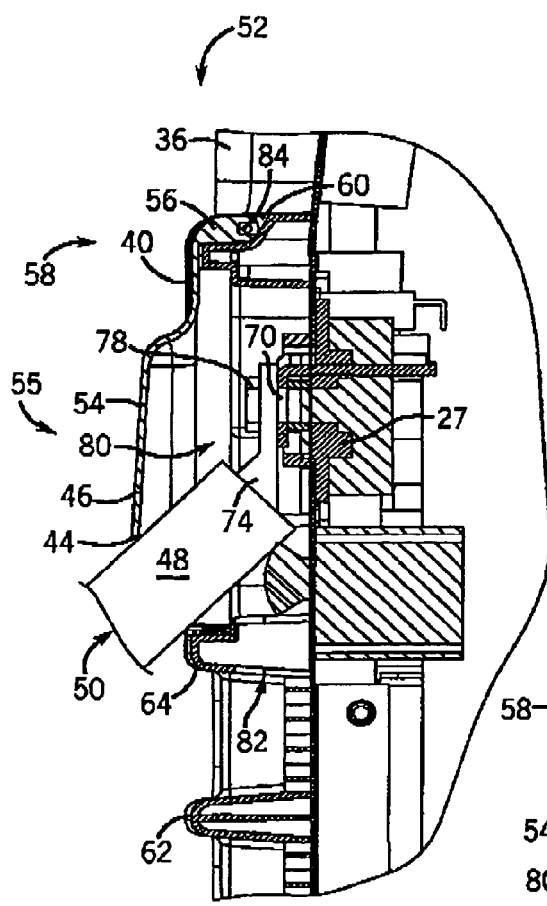
FIG. 3 is a cross-sectional view of the terminal post connection of the welding-type device taken along plane 3-3 shown in FIG. 2.
Figure 4:
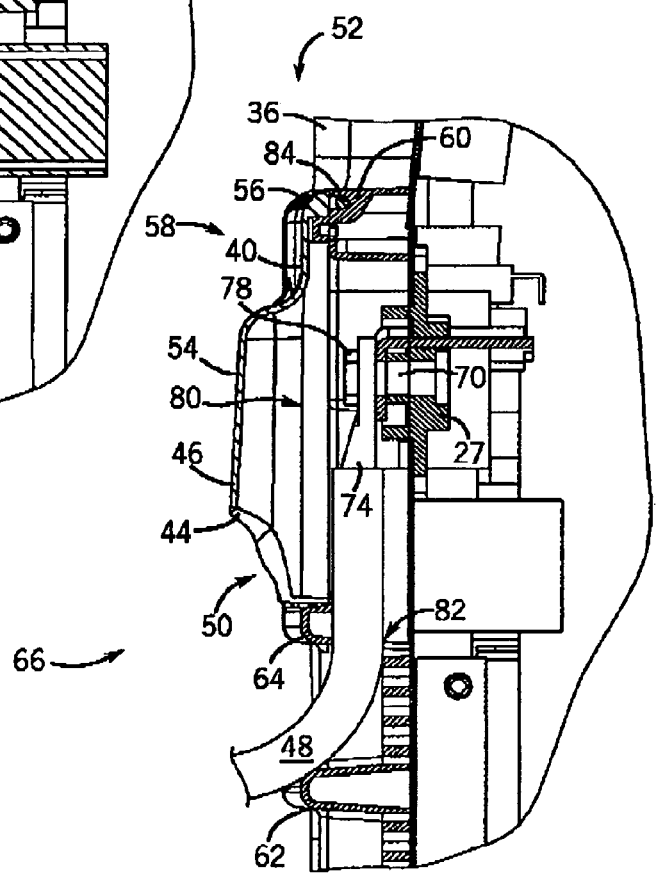
FIG. 4 is a cross-sectional view of the terminal post connection of the welding-type device taken along plane 4-4 shown in FIG. 2.

FIG. 3 and FIG. 4 show respective first and second cable orientations 55, 66, respectively. FIG. 3 shows a cross-section of first cable orientation 55. Connector 74 of cable 48 is attached to terminal post 70 of end panel 27 of welding device 10 via nut 78. Cable 48 extends from welding device 10 through opening 50 between arc-shaped recess 44 located in lower portion 46 of terminal post cover 40 and uppermost rib 64 of bezel 36. Terminal post cover 40 is located over first opening 80 of bezel 36. Hinge portion 56 is located in upper portion 58 of terminal post cover 40. Hinge portion 56 of terminal post cover 40 interacts with hinge portion 60 of bezel 36. Hinge portion 56 and hinge portion 60 are pivotably attached to one another by a hinge pin 84. Hinge pin 84 is the pivot point and is common for all covers 40, 42. Additionally, the importance of protrusion 54 of terminal post cover 40 becomes apparent in FIG. 3. Protrusion 54 is constructed to accommodate the passage of cable 48 therebehind with terminal post cover 40 in closed position 52. Additionally, protrusion 54 is also constructed to accommodate connector 74 therebehind. Second opening 82 of bezel 36 is also shown in FIG. 3 without cable 48 passing therethrough.

FIG. 4, in comparison with FIG. 3, shows second cable orientation 66. Cable 48 is secured to terminal post 70 in much the same manner as discussed above. However, rather than cable 48 passing through opening 50 under terminal post cover 40, cable 48 passes through second opening 82 of bezel 36. Cable 48 passes through second opening 82 of bezel 36 and exits welding device 10 between uppermost rib 64 and lateral rib 62. Second opening 82 is large enough to allow for the passage of terminal connector 74 of cable 48 therethrough.

Referring to FIG. 5 and FIG. 6, cross-sectional top views of the welding device are shown. FIG. 5 shows a portion of the cross-section of the welding device taken above terminal posts 70. FIG. 6 shows a portion of the cross-section of the welding device taken below terminal posts 70. Referring to FIG. 5, the two most left cables 48 exit welding device 10 in first cable orientation 55 while the most right cable exits welding device 10 in second cable orientation 66. Additionally, it is show that electrical array 68 and corresponding cover array 39 occupy a majority of the width of welding device 10. Additionally, the general curvature of protrusion 54 of terminal post covers 40 is constructed to generally match the curvature of cable 48 and accommodate the terminal connector 74 therebehind.

FIG. 6 shows how each respective terminal post cover 40 of bezel 36 has a corresponding second opening 82 of uppermost rib 64 of bezel 36. Shown in FIG. 3, connector 74 of cable 48, having a bend or being able to be bent, provides for the passage of cable 48 through first opening 50. Bezel 36, for each terminal post cover 40 of bezel 36, includes first opening 50 under protrusion 54 of terminal post cover 40 and second opening 82 of uppermost rib 64 of bezel 36. This construction provides that each terminal post is provided with two passages through bezel 36 for a cable to be passed therethrough.

The present invention relates to a housing of a welding-type power supply. The housing includes a front panel which includes a bezel and an end panel. The end panel includes and electrical array of multiple terminal posts and multiple receptacles. The multiple terminal posts are connected to cables which provide conditioned power to a work piece. The multiple receptacles are constructed to provide a user with access to other conditioned power signals. These receptacles are preferably a plurality of 110/120 volt outlets and/or 220/240 volt outlet for uses that require such a power source. A cover array covers the electrical array. Each of the covers that are part of the cover array is pivotably attached to the bezel. The cover array shares a common hinge pin but is constructed such that individual covers are individually pivotable with respect to the other covers and the bezel.

Those covers disposed over the terminal posts of the electrical array have an arc-shaped recess and a protrusion formed therein. The arc-shaped recess and the protrusion are constructed such that terminal post covers can be in a closed position when a cable passes there under and there behind respectively. The bezel also includes a plurality of lateral ribs. The lateral ribs divide a honey-combed opening of the end panel. An uppermost rib of the bezel has therein an opening. This opening is constructed to allow passage of a cable therethrough. The honey-combed opening is constructed to provide a passage for cooling air into and through the welding-type power supply.

Therefore, in accordance with one embodiment of the present invention, a housing of a welding-type apparatus includes a bezel attached to an end panel. The bezel includes a plurality of covers which are pivotally attached to the bezel over a plurality of terminal post openings. Each cover has a passage therein to allow passage of a cable therethrough when the covers are in a closed position.

In accordance with another embodiment of the present invention, a housing of a welding-type device includes an end panel and a bezel. A plurality of terminal posts is attached to the end panel of the welding-type device. The bezel is attached to the end panel thereby covering the plurality of terminal posts of the end panel. The bezel includes at least two passages formed therein in association with each of the plurality of terminal posts. Both of the passages per terminal post are constructed to allow passage of a welding cable therethrough.

In accordance with a further embodiment of the present invention, a welding-type device includes an end panel, a bezel, and a plurality of covers attached to the bezel. The bezel is attached to the end panel with the respective covers positioned over respective electrical components of the end panel of the welding-type device. The covers are attached to the bezel by a common hinge pin such that the covers are independently pivotable about the hinge pin.

In accordance with still a further embodiment of the present invention, a method of assembling a welding device is disclosed. The method includes forming a bezel having a plurality of covers commonly hinged thereto. The bezel is then attached to the welding device such that the covers pivotally conceal electrical components of the welding device.

In accordance with yet a further embodiment of the present invention, a method of assembly a welding device includes forming a bezel having a lateral rib. A lower cable passage is formed in the lower rib to allow passage of a cable therethrough. The bezel is then attached to the welding device so that the cable can be connected to a terminal post of the welding device.

In accordance with another embodiment of the present invention, a welding device includes a bezel. The bezel includes a control window, a cover array and an opening to allow the passage of air through the bezel via a dividing web. The cover array is attached to the control window between the control window and the opening. The cover array of the bezel has a uniform pivot axis such that the individual covers of the cover array are aligned with respect to the uniform axis.

The present invention has been described in terms of the preferred embodiment, and it is recognized that equivalents, alternatives, and modifications, aside from those expressly stated, are possible and within the scope of the appending claims.

What is claimed is:

1. A welding-type apparatus housing comprising:
   an end panel;
   a bezel attached to the end panel and having a plurality of covers pivotally attached to the bezel over a plurality of terminal posts openings, each having a passage therein to allow cable passage therethrough when the covers are in a closed position.

2. The welding-type apparatus housing of claim 1 wherein at least one of the covers has formed therein an arc-shaped opening that allows passage of a cable thereunder.

3. The welding-type apparatus housing of claim 1 wherein at least one of the covers further comprises a protrusion located centrally therein.

4. The welding-type apparatus housing of claim 1 wherein the plurality of covers are pivotally attached to the end panel along a common axis.

5. The welding-type apparatus housing of claim 4 further comprising a hinge.

6. The welding-type apparatus housing of claim 1 further comprising a plurality of accessory outlets in the end panel and a plurality of doors pivotally attached to the bezel to cover the accessory outlets.

7. The welding-type apparatus housing of claim 6 wherein a door has more than one opening to allow cable passage.

8. The welding-type apparatus of claim 1 further comprising a ventilation opening having a honey-combed shape.

9. A housing of a welding-type device comprising:
   an end panel;
   a plurality of terminal posts arranged in the end panel;
   a bezel attached to the end panel, the bezel having at least two cable passages formed therein in association with each of the plurality of terminal posts; and
   covers attached to the bezel over at least one of the at least two cable passages, wherein the covers are independently rotatable about a common axis.

10. The housing of a welding-type device of claim 9 further comprising at least one utility receptacle attached to the end panel.

11. The housing of a welding-type device of claim 10 further comprising a door over the at least one utility receptacle.

12. The housing of a welding-type device of claim 9 further comprising a hinge.

13. The housing of a welding-type device of claim 9 wherein the covers further comprise a cable opening at a lower end of each cover.

14. The housing of a welding-type device of claim 9 wherein the covers further comprise a protrusion in the cover to accommodate cable passage.

15. The housing of a welding-type device of claim 9 wherein die at least two cable passages are perpendicular to one another.

16. A welding-type device comprising:
   an end panel;
   a bezel attached to the end panel of the welding-type device; and
   a plurality of covers pivotally attached to the bezel by a common hinge pin.

17. The welding-type device of claim 16 further comprising an opening in the end panel having a honey-combed shape.

18. The welding-type device of claim 16 further comprising a plurality of terminal posts attached to the end panel under respective covers of the plurality of covers.

19. The welding-type device of claim 18 wherein the covers over the terminal posts further comprise a cable recess.

20. The welding-type device of claim 16 wherein the bezel further comprises at least two cable passages for each of the plurality of terminal posts.

21. The welding-type device of claim 16 further comprising a hinge that attaches the plurality of covers to the bezel.

22. The welding-type device of claim 16 wherein the plurality of covers are aligned horizontally in a center portion of the bezel.

23. The welding-type device of claim 16 wherein the plurality of covers pivot about a common axis.

24. The welding-type device of claim 16 wherein the plurality of covers are aligned along a width of the end panel.

25. A method of assembling a welding device comprising:
   forming a bezel having a plurality of covers commonly hinged thereto; and
   attaching the bezel to die welding device.

26. The method of claim 25 further comprising forming the bezel with a lower cable passage formed in a ventilation web to allow cable passage therethrough.

27. A method of assembling a welding device comprising:
   forming a bezel with a plurality of covers commonly hinged thereto and with a lower cable passage formed in a lateral rib to allow cable passage therethrough; and
   attaching the bezel to the welding device.

* * * * *

UNITED STATES PATENT AND TRADEMARK OFFICE
CERTIFICATE OF CORRECTION

PATENT NO. : 7,288,740 B2 Page 1 of 1
APPLICATION NO. : 10/249909
DATED : May 16, 2003
INVENTOR(S) : David E. Radtke It is certified that error appears in the above-identified patent and that said Letters Patent is hereby corrected as shown below:

Col. 9, line 29 (Claim 15), delete "die" and substitute therefore -- the --.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,288,740 B2 |
| APPLICATION NO. | : 10/249909 |
| DATED | : October 30, 2007 |
| INVENTOR(S) | : David E. Radtke |

Page 1 of 1

It is certified that error appears in the above-identified patent and that said Letters Patent is hereby corrected as shown below:

Col. 9, line 29 (Claim 15), delete "die" and substitute therefore -- the --.

This certificate supersedes the Certificate of Correction issued April 22, 2008.

Signed and Sealed this

Twentieth Day of May, 2008

JON W. DUDAS
*Director of the United States Patent and Trademark Office*